(12) United States Patent
Traut (10) Patent No.: US 7,552,426 B2
(45) Date of Patent: Jun. 23, 2009

(54) SYSTEMS AND METHODS FOR USING SYNTHETIC INSTRUCTIONS IN A VIRTUAL MACHINE

(75) Inventor: Eric Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 10/685,051

(22) Filed: Oct. 14, 2003

(65) Prior Publication Data

US 2005/0081199 A1 Apr. 14, 2005

(51) Int. Cl.
G06F 9/45 (2006.01)
G06F 9/44 (2006.01)
G06F 9/455 (2006.01)
G06F 9/30 (2006.01)
G06F 7/38 (2006.01)

(52) U.S. Cl. .................. 717/138; 717/134; 703/23; 712/209; 712/227

(58) Field of Classification Search ............... None
See application file for complete search history.

(56) References Cited

U.S. PATENT DOCUMENTS

| | | | | |
|---|---|---|---|---|
| 6,397,242 | B1 * | 5/2002 | Devine et al. ............ | 718/1 |
| 6,658,657 | B1 * | 12/2003 | Lueh ...................... | 717/158 |
| 7,127,548 | B2 * | 10/2006 | Bennett et al. ........... | 711/6 |
| 7,191,440 | B2 * | 3/2007 | Cota-Robles et al. ...... | 718/1 |
| 2002/0165848 | A1 * | 11/2002 | Rautenbach et al. ........ | 707/1 |
| 2003/0217250 | A1 * | 11/2003 | Bennett et al. .............. | 712/224 |
| 2004/0025158 | A1 * | 2/2004 | Traut ......................... | 718/1 |
| 2005/0076186 | A1 * | 4/2005 | Traut ......................... | 712/1 |
| 2005/0080753 | A1 * | 4/2005 | Vega et al. .................. | 706/21 |

FOREIGN PATENT DOCUMENTS

EP 1524596 4/2005

OTHER PUBLICATIONS

Robin et al., "Analysis of the Intel Pentium's Ability to Support a Secure Virtual Machine Monitor", Aug. 14, 2000, USENIX, pp. 1-17.*
A. Tamches, "Fine-Grained Dynamic Instrumentation of Commodity Operating System", May 2001, University of Wisconsin—Madison, pp. 1-213.*
J. S. Robin, "Analyzing the Intel Pentium's Capability to Support a Secure Virtual Machine Monitor", Sep. 1999, Naval Postgraduate School, pp. 1-98.*

(Continued)

Primary Examiner—Tuan Q Dam
Assistant Examiner—Ben C Wang
(74) Attorney, Agent, or Firm—Woodcock Washburn LLP (57) ABSTRACT

The present invention compensates for the shortcomings in x86 processor architectures by providing a set of "synthetic instructions" that cause a trap and thereby provide an opportunity for the virtual machine (VM) to process the instructions safely. By using instructions that are "illegal" to the x86 architecture, but which are nonetheless understandable by a virtual machine, the method of using these synthetic instructions to perform well-defined actions in the virtual machine that are otherwise problematic when performed by traditional instructions to an x86 processor but provide much-improved processor virtualization for x86 processor systems.

66 Claims, 6 Drawing Sheets

OTHER PUBLICATIONS

K. P. Lawton, "Bochs x86 Emulator—monitor-host.c", Mar. 25, 2000, bochs.sourceforge.net, pp. 1-42.*

Carlos et al., "User-Kernel Reactive Threads for Linux", Jan. 2003, SCI 2003, pp. 1-6.*

V86, "Virtual 8088 Mode", 1986, Intel 80386 Programmer's Reference, pp. 1-18.*

K. Lawton, "Running Multiple Operating Systems Concurrently on an IA32 PC Using Virtualization Techniques", Nov. 1999, pp. 1-44.*

* cited by examiner

| 22-32 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|
| 0 | ID | VIP | VIF | AC | VM | RF | 0 | NT | IOPL | | OF | DF | IF | TF | SF | ZF | 0 | AF | 0 | PF | 1 | CF |

FIG. 4

| Processor Mode | Default Virtualization Technique |
|---|---|
| Real mode (including SMM) | Emulation |
| Virtual 8086 mode | Direct Execution |
| Protected mode: Ring 0, 1 and 2 | Emulation |
| Protected mode: Ring 3 | Direct Execution |

FIG. 5

| Instruction | Virtualization Issue |
|---|---|
| PUSH CS | Exposes current ring level (which is encoded within the bottom two bits of CS) |
| PUSH SS | Exposes current ring level (which is encoded within the bottom two bits of SS) |
| MOV from SS | Exposes current ring level (which is encoded within the bottom two bits of SS) |
| CALLF | Exposes current ring level (which is encoded within the bottom two bits of the pushed CS) |
| SGDT | Non-trapping instruction exposes real (VMM) GDT |
| SLDT | Non-trapping instruction exposes real (VMM) LDT |
| SIDT | Non-trapping instruction exposes real (VMM) IDT |
| STR | Non-trapping instruction exposes real (VMM) TR |

FIG. 6

| Instruction | Virtualization Issue |
|---|---|
| VERR | May return incorrect value because of modified DPL or descriptor type |
| VERW | May return incorrect value because of modified DPL or descriptor type |
| LAR | May return incorrect access rights because of modified DPL or descriptor type |

FIG. 7

| Instruction | Virtualization Issue |
|---|---|
| CPUID | Non-trapping; no opportunity to return information that differs from the host processor. |
| PAUSE | Non-trapping; no opportunity to detect spin-lock condition on MP guest. |

FIG. 8

| Instruction | Virtualization Issue |
|---|---|
| PUSHF/PUSHFD | May push value within incorrect IF and IOPL fields. |
| POPF/POPFD | Value of IF and IOPL are ignored, even if guest CPL = 0. |
| IRET/IRETD | If returning to the same privilege level and same code selector (i.e. the CS on the stack is the same as the current CS), value of IF and IOPL are ignored, even if guest CPL = 0. |

SYSTEMS AND METHODS FOR USING SYNTHETIC INSTRUCTIONS IN A VIRTUAL MACHINE

TECHNICAL FIELD

The present invention generally relates to the field of operating systems and, more specifically, to the use of instructions understandable by a virtual machine (or processor virtualization) but that are defined as "illegal" by a predefined processor architecture (e.g., the x86 architectures) such that, when executed within a virtual machine environment, the invention utilizes these instructions to perform well-defined legal actions. In a sense, the invention adds "synthetic" instructions to a pre-existing instruction set.

BACKGROUND

Virtual Machines

Computers include general purpose central processing units (CPUs) that are designed to execute a specific set of system instructions. A group of processors that have similar architecture or design specifications may be considered to be members of the same processor family. Examples of current processor families include the MOTOROLA 680x0 processor family, manufactured by MOTOROLA, Inc. of Phoenix, Ariz.; the INTEL 80x86 processor family, manufactured by INTEL Corporation of Sunnyvale, Calif.; and the POWERPC processor family, which is manufactured by MOTOROLA, Inc. and used in computers manufactured by APPLE Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the INTEL 80x86 processor family is incompatible with the instruction set used by the POWERPC processor family. The INTEL 80x86 instruction set is based on the Complex Instruction Set Computer (CISC) format. The MOTOROLA POWERPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the INTEL 80x86 processor family will have a hardware architecture that is different from the hardware architecture of a computer system manufactured with a processor from the POWERPC processor family. Because of the uniqueness of the processor instruction set and a computer system's hardware architecture, application software programs are typically written to run on a particular computer system running a particular operating system.

A computer manufacturer will want to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software design for its own hardware architecture and software written for computers having an unrelated hardware architecture. As a more specific example, a computer system manufactured by APPLE Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the host computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by CONNECTIX Corporation of San Mateo, Calif. emulates an entire computer that includes an INTEL 80x86 Pentium processor and various motherboard components and cards. The operation of these components is emulated in the virtual machine that is being run on the host machine. An emulator program executing on the operating system software and hardware architecture of the host computer, such as a computer system having a POWERPC processor, mimics the operation of the entire guest computer system. The emulator program acts as the interchange between the hardware architecture of the host machine and the instructions transmitted by the software running within the emulated environment.

The x86 Architectures

"x86" is the generic name for the series all microprocessor families that use the x86 instruction set architecture (ISA). IA32 is specific processor architectures developed by INTEL that uses the x86 ISA. x86 began with the INTEL's 8086 microprocessor. x86 processors include but are not limited to Intel's 8086, 286, 386, 486, PENTIUM, PENTIUM with MMX, PENTIUM PRO, PENTIUM II, PENTIUM III, and PENTIUM 4 processor families, as well as Advanced Micro Device's (AMD's) K5, K6, K6-2, K6-3, ATHLON, Enhanced ATHLON (a.k.a. "thunderbird"), ATHLON 4, and ATHLON MP, ATHLON 64, OPERTON, among others.

A virtual machine monitor (VMM) is a software layer that runs directly above the hardware, and the VMM virtualizes all the resources of the machine by exposing interfaces that are the same as the hardware the VMM is virtualizing (which enables the VMM to go unnoticed by operating system layers running above it). However, the x86 architectures, including the IA32 architecture and the like, contain many virtualization holes that present a number of challenges for a VMM implementation. First, the x86 architecture does not divide all processor state into either privileged state or user state where, among other things, privileged state should include any control or status fields that indicates the current privilege level, as well as other resources that need to be under the control of the underlying operating system (or "supervisor layer") to implement resource control and protection barriers between user-level application instances. Second, the x86 architecture does not cause traps in all cases when access to a privileged state (whether read or write) is attempted at a user level. Third, the x86 architecture has no means for causing a trap when user-level code attempts to access a non-privileged state that should be virtualized (e.g. timer values, performance counters, processor feature registers). Fourth, while all in-memory processor structures should be either stored outside of the current address space or be protectable from errant or malicious memory accesses within the VM, the x86 architecture does not allow for this. Fifth and last, x86 architectures cannot restore all processor state at the time of an interrupt or trap to its pre-trap state after the interrupt or trap is handled.

SUMMARY

Many of these aforementioned shortcomings and limitations of the x86 architectures result from instructions that fail to cause a trap when one is desired. In other words, if these instructions would instead cause a trap, a virtual machine monitor (VMM) could correctly virtualize these instructions.

The present invention compensates for the shortcomings in x86 processor architectures by introducing "synthetic instructions" that cause a trap and thereby provide an opportunity for the virtual machine (VM) to process the instructions safely. By using instructions that are "illegal" to the x86 architecture but which are nonetheless understandable by a virtual machine, the present method uses synthetic instructions to perform well-defined actions in the virtual machine that are otherwise problematic when performed by traditional instructions executed on an x86 processor and thereby provides much-improved processor virtualization for x86 processor systems.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The inventive subject matter is described with specificity to meet statutory requirements. However, the description itself is not intended to limit the scope of this patent application. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Finally, while the discussion herein below may at times focus on the IA32 architecture and/or the x86 processor family, nowhere is the disclosure herein intended to be limited to these subgroups, and any such discussion hereby expressly includes all applicable processor architectures to which the various embodiments of the present invention may be applied and/or utilized, including but not limited to all x86 processor architectures and their equivalents, and expressly including the IA32 and IA64 architectures and their equivalents, extensions, and derivations.

Computer Microprocessors

A microprocessor is a computer processor on a microchip. It is designed to perform arithmetic and logic operations that make use of small number-holding areas called registers. Typical microprocessor operations include adding, subtracting, comparing two numbers, and fetching numbers from one area to another. These operations are the result of a set of instructions that are part of the microprocessor design.

An instruction is an order given to a computer processor by a computer program. At the lowest level, each instruction is a sequence of 0s and 1s that describes a physical operation the computer is to perform (such as "Add") and, depending on the particular instruction type, the specification of special storage areas called registers that may contain data to be used in carrying out the instruction, or the location in computer memory of data.

A register is one of a small set of data holding places that are part of a computer processor. A register may hold a computer instruction, a storage address, or any kind of data (such as a bit sequence or individual characters). Some instructions specify registers as part of the instruction. For example, an instruction may specify that the contents of two defined registers be added together and then placed in a specified register. A register must be large enough to hold an instruction—for example, in a 32-bit instruction computer, a register must be 32 bits in length. In some computer designs, there are smaller registers—for example, half-registers—for shorter instructions. Depending on the processor design and language rules, registers may be numbered or have arbitrary names. As used herein, however, the specific registers, specific instructions, and other technical elements described with specificity herein are based on the x86 architecture and, as such, are widely known and well-understood by those of skill in the art.

Virtual Machine Architecture

Figure 1:
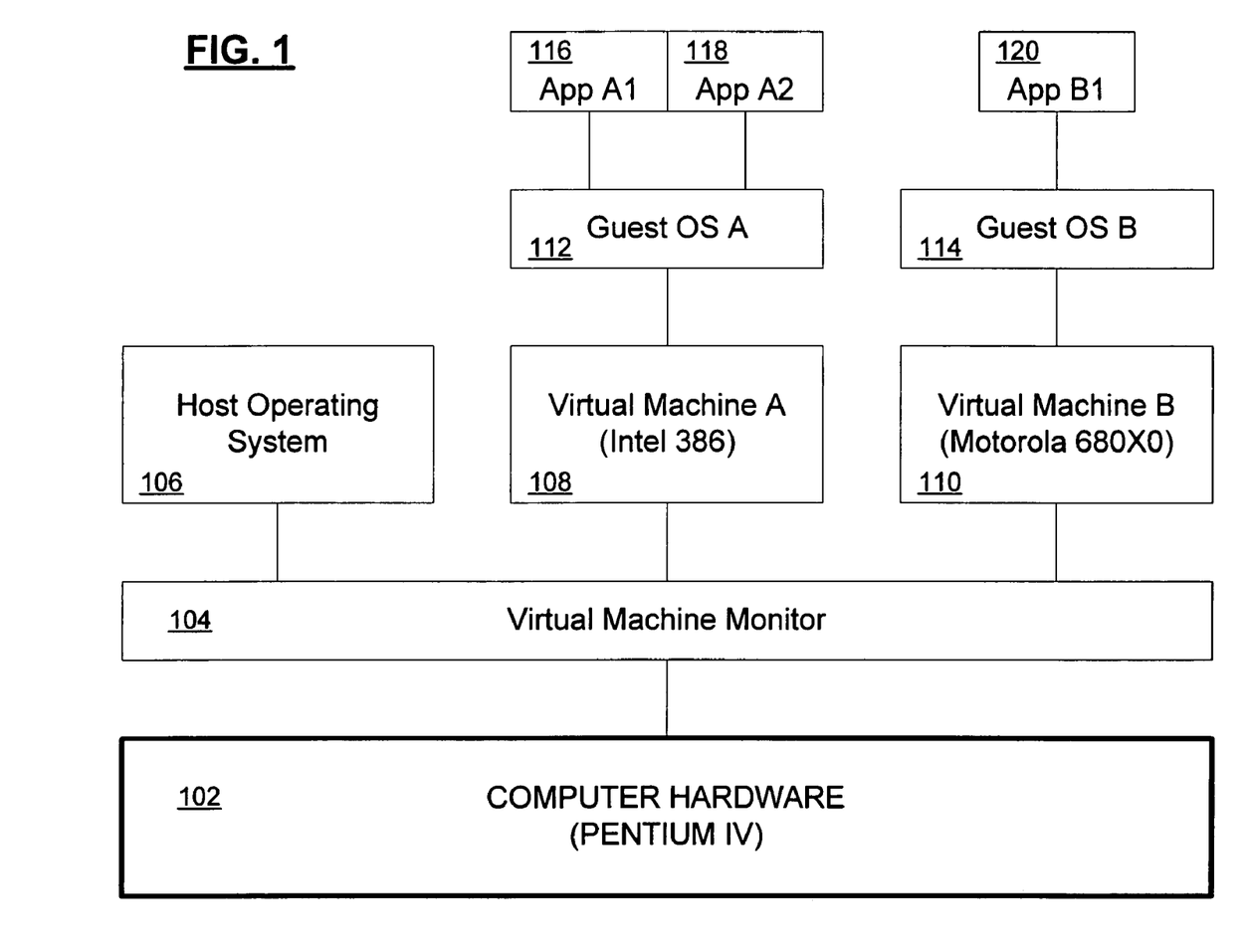
FIG. 1 illustrates a virtualized computing system comprising a virtual machine monitor (VMM) software layer running directly above the computer hardware and interfacing with two virtual machines (VMs)

FIG. 1 illustrates a virtualized computing system comprising a virtual machine monitor (VMM) software layer 104 running directly above the hardware 102, and the VMM 104 virtualizes all the resources of the machine by exposing interfaces that are the same as the hardware the VMM is virtualizing (which enables the VMM to go unnoticed by operating system layers running above it). Above the VMM 104 are two virtual machine (VM) implementations, VM A 108 which is a virtualized INTEL 386 processor, and VM B 110 which is a virtualized version of one or more of the MOTOROLA 680x0 family of processors. Above each VM 108 and 110 are guest operating systems A 112 and B 114 respectively. Above guest OS A 112 are running two applications, application A1 116 and application A2 118, and above guest OS B 114 is Application B1 120.

Figure 2:
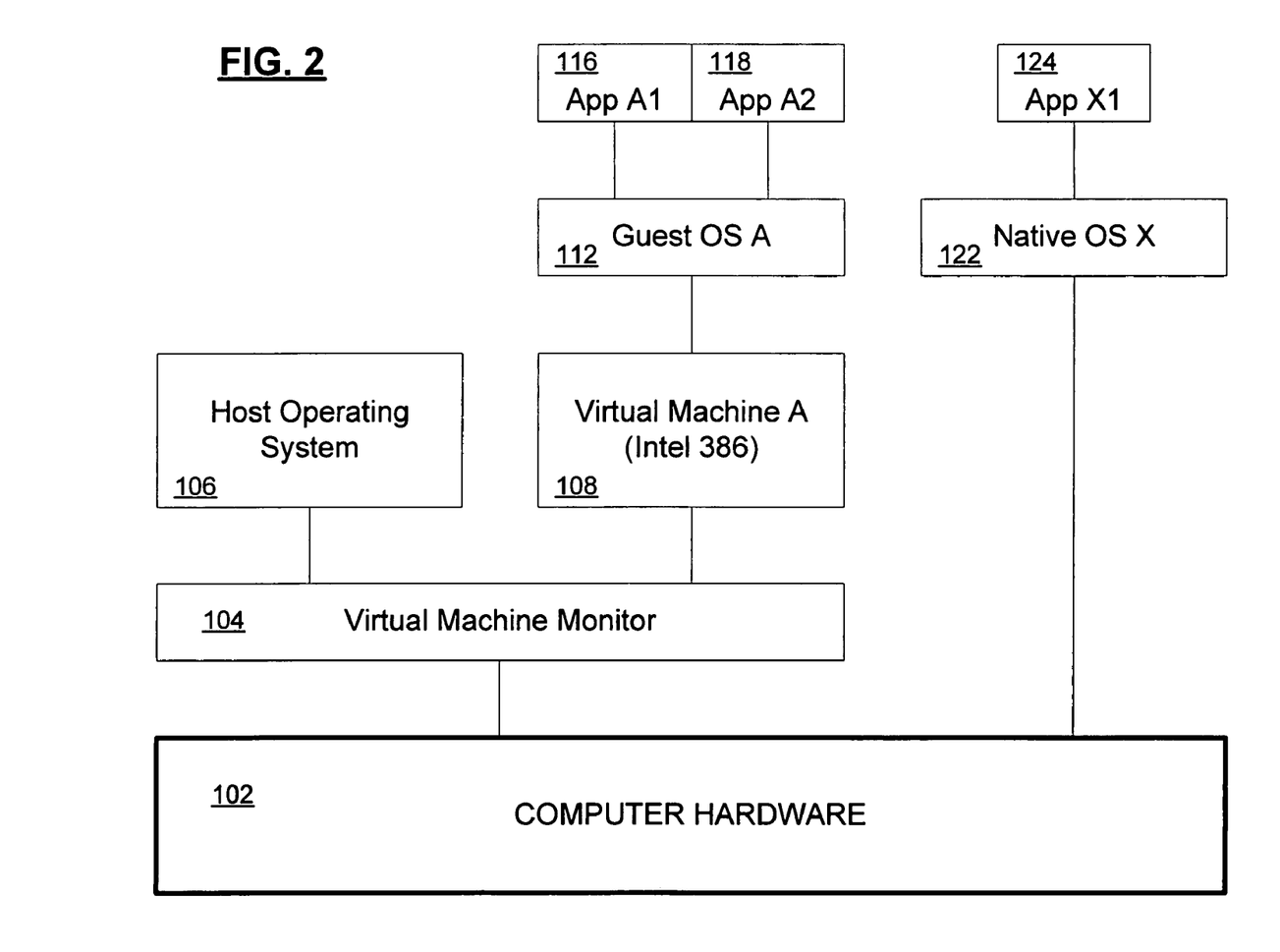
FIG. 2 illustrates the virtualized computing system environment of FIG. 1 but further comprising a host (native) operating system that directly interfaces with the computer hardware.

FIG. 2 illustrates a similarly virtualized computing system environment, but having a host (native) operating system× 122 that directly interfaces with the computer hardware 102, and above native OS X 122 is running application X 124.

Figure 3:
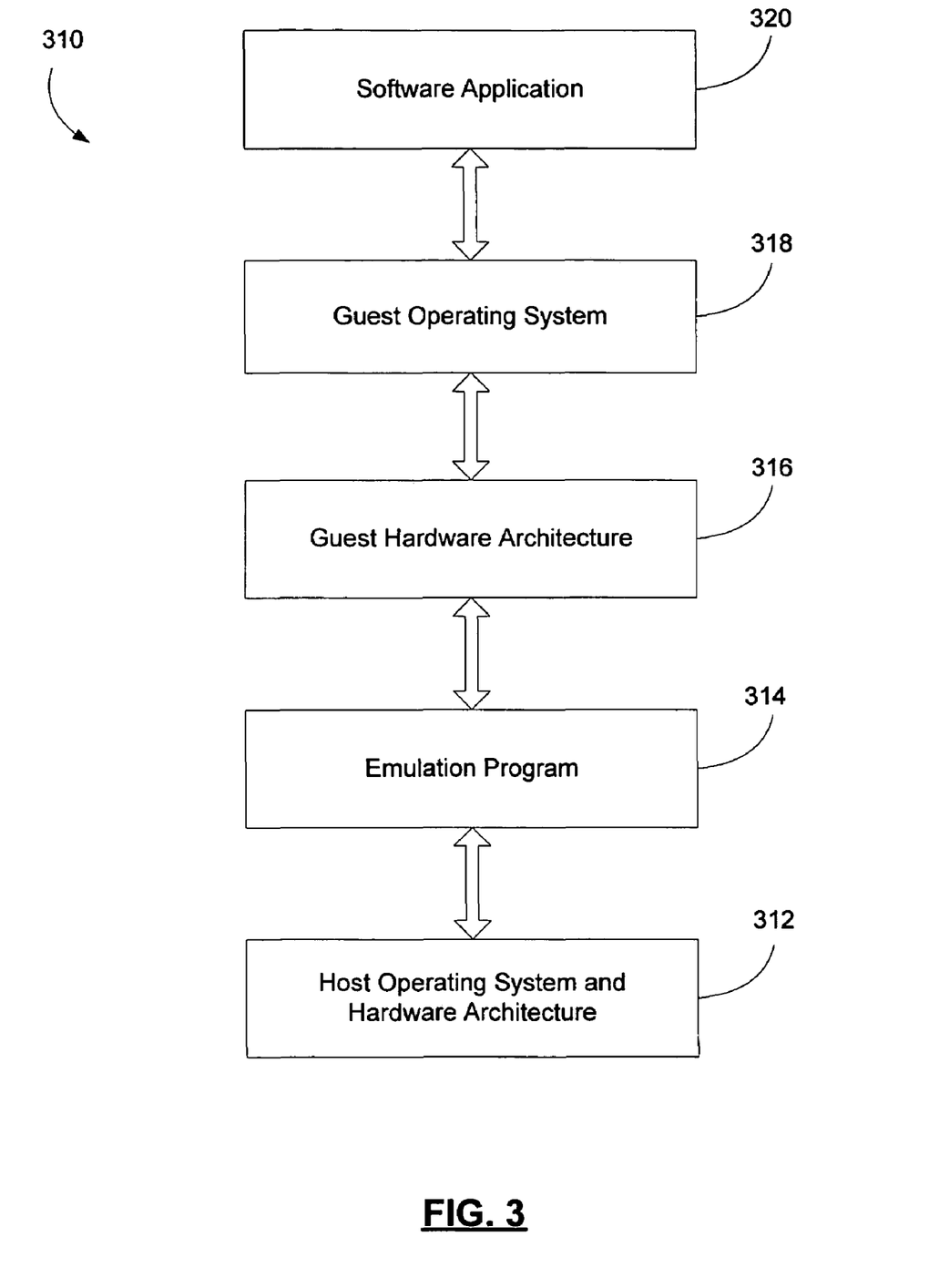
FIG. 3 is a diagram of the logical relationship of the elements of an emulated computer system running in a host computer system.

FIG. 3 is a diagram of the logical layers of the hardware and software architecture for an emulated operating environment in a computer system 310. An emulation program 314 runs on a host operating system and/or hardware architecture 312. Emulation program 314 emulates a guest hardware architecture 316 and a guest operating system 318. Software application 320 in turn runs on guest operating system 319. In the emulated operating environment of FIG. 3A, because of the operation of emulation program 315, software application 320 can run on the computer system 310 even though software application 320 is designed to run on an operating system that is generally incompatible with the host operating system and hardware architecture 312.

Processor Virtualization

There are two methods for providing processor virtualization in a virtual machine (VM): emulation and direct execution. Virtual machines may use either method or both (a "hybrid") to provide processor virtualization.

Emulation involves the use of either an interpreter or a binary translation mechanism, and is also the only feasible choice when implementing a VM on a system where the guest and host processors are significantly different. For example, Microsoft Virtual PC for Macintosh implements an x86-based VM (emulating an x86 processor architecture) on a POWERPC-based Macintosh system. Emulation is also necessary for situations where the guest and host processors are the same but where the processor provides inadequate virtualization support. Certain operating modes of the x86 architecture fall into this category.

However, while emulation is the most flexible and compatible virtualization mechanism, it is usually not the fastest. Emulation by either interpretation or binary translation imposes a runtime overhead. In the case of interpretation, which is relatively easy to implement, the overhead is often on the order of 90-95% (that is, the resulting performance will only be 5-10% of the "native" performance). A binary translation mechanism, on the other hand, is more complex than an interpreter, and therefore more difficult to implement, but such a mechanism suffers less performance loss and may require an overhead of only 25-80% (i.e., the resulting performance is 20-75% of the "native" performance).

In general, direct execution is faster and more efficient than emulation using either approach. A good direct execution implementation can achieve, within only a few percent points difference, performance nearly equivalent to native performance. However, as known and appreciated by those of skill in the art, direct execution typically relies on processor protection facilities to prevent the virtualized code from "taking over" the system. More specifically, direct execution relies on the processor to differentiate between user-level and privileged-level operations (that is, software that accesses privileged-level processor resources versus user-level resources).

Software running in privileged mode (that is, trusted software) is able to access privileged processor resources including registers, modes, settings, in-memory data structures, and so forth. In contrast, user mode is intended for untrusted software that performs the majority of the computational work in a modem system. Many processors (but not all) make a strict distinction between user-level state and privileged-level state (corresponding to each mode), and access to privileged-level state is not allowed when the processor is operating in user mode. This distinction allows the host operating system (or its equivalent) to protect key resources and prevent a buggy or malicious piece of user-level software from crashing the entire system.

For direct execution of user-level code, any privilege violations are caught by the VMM and passed on to the guest's exception handlers. Direct execution of privileged-level code, however, involves running privileged-level code at user-level despite the fact that privileged-level code is written with the assumption that it will have full access to all privileged state elements of the processor. To reconcile this inconsistency, the VM relies on the processor to generate a trap for all privileged instructions (i.e. instructions that directly or indirectly access privileged state). The privilege violation trap invokes a trap handler within the virtual machine monitor (VMM). The VMM's trap handler then emulates the implied state changes of the privileged instruction and returns control back to the subsequent instruction. This emulation of a privileged instruction often involves the use of shadow state that is private to a particular VM instance.

For example, if a processor architecture includes a privileged mode register (PMR), which can only be accessed in privileged mode, any attempt to read from or write to the PMR from user-level code would cause a trap. The VMM's trap handler would determine the cause of the trap and refer to a PMR shadow value that is private to the instance of the associated VM. (This PMR value may be different from the value currently held in the host processor's PMR.)

Depending on the frequency of trapping instructions and the cost of handling a trap, this technique may impose a relatively small but noticeable performance penalty. For example, some VMMs developed by IBM and AMDAHL performed at 80-98% of native speed, thus netting a 2-15% performance loss due to this trapping overhead.

Limitations of x86/IA32

An idealized processor intended for virtualization is said to be strictly virtualizable-that is, a strictly virtualizable processor allows for the implementation of a direct execution virtualization mechanism that meets the following requirements:
(a) The VMM must be able to stay "in control" over processor and system resources.
(b) Software running within the VM (whether at user or privileged level) should not be able to tell that it is running within a virtual machine.

To meet these requirements, a strictly virtualizable processor exhibits the following properties:
  Incorporates a memory management unit (MMU) or similar address translation mechanism Provides two or more privilege levels Divides all processor state into either privileged state or user state; privileged state should include any control or status fields that indicates the current privilege level Causes a trap when any access to privileged state (whether read or write) is attempted at user level Has the means to optionally cause a trap when user-level code attempts to access non-privileged state that should be virtualized (e.g. timer values, performance counters, processor feature registers)

All in-memory processor structures are either stored outside of the current address space or are protectable from errant or malicious memory accesses within the VM Any processor state at the time of an interrupt or trap can be restored to its pre-trap state after the interrupt or trap is handled Several modern processors—including POWERPC and DEC Alpha, to name a few—meet these requirements. However, IA32 does not—it only meets the first two requirements. Thus the IA32 architecture contains many virtualization holes that present a number of challenges for a VMM implementation.

Figures 4, 5:
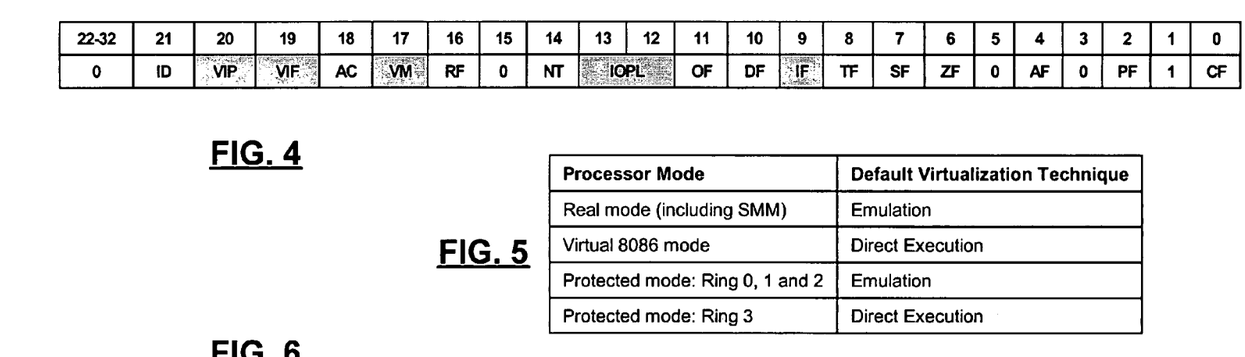
FIG. 4 illustrates the EFLAGS register of an x86 processor (specifically for the IA32 architecture).
FIG. 5 illustrates the four distinct processor mode categorizations typically recognized by a virtual machine monitor (VMM).

First, the IA32 architecture violates the requirement of user/privileged state separation in several instances, the most significant of which involves the EFLAGS register which contains both user and privileged state as illustrated in FIG. 4. The following EFLAGS fields should be considered privileged: VIP, VIF, VM, IOPL, and IF. (All other fields represent user state and do not need to be privileged.) However, for IA32, instructions that read and write the privileged fields of the EFLAGS register (including PUSHF/PUSHFD, POPF/POPFD and IRET) do not trap when executed from user mode, and there is no means in IA32 to force these instructions to trap.

Furthermore, in IA32 the PUSHF and POPF instructions are often used within a guest kernel (ring 0) code to save and restore the state of the IF (interrupt enable flag). Within a virtual machine, this kernel code is executed at a higher ring level (e.g. at ring 1) and the IOPL is set such that IN/OUT instructions trap. Because the operating system (OS) running within the VM should not be allowed to disable interrupts on the host processor, the actual IF value is set to 1 while the virtual machine code is running, regardless of the state of the virtual IF. Consequently, the PUSHF instruction always pushes an EFLAGS value with IF=1, and the POPF instruction always ignores the IF field in the popped EFLAGS value.

In addition to the EFLAGS register, two additional areas where privileged and user states are mixed are in the CS and SS registers. The bottom two bits of these registers contain the current privilege level (CPL) which is a privileged state, while the upper fourteen bits of these registers contain the segment index and descriptor table selector which is not privileged. Instructions that explicitly or implicitly access the CS or SS selector (including CALLF, MOV from SS and PUSH SS) do not trap when executed from user mode. Note that other instructions cause CS or SS to be pushed onto the stack (e.g. INT, INTO, JMPF through call gate, CALLF through call gate), but these instructions can be trapped, allowing the VMM to virtualize the pushed CPL value.

Additional inadequacies of the x86/IA32 protection model that allow user-level code to directly access privileged processor state include the following instructions: SGDT, SIDT, SLDT, SMSW, and STR. For a variety of reasons, shadowing of the GDT, LDT, IDT and TR is necessary for correct virtualization, which means the TR, GDTR and IDTR will point to the VMM's shadow tables, not the table specified by the guest operating system. However, because non-privileged code can read from these registers, it is not possible to correctly virtualize their contents. In addition, several instructions that access the descriptors within the GDT and LDT do not trap when executed from non-privileged state, including LAR, LSL, VERR, and VERW. Because GDT/LDT shadowing is necessary, these four instructions may execute incorrectly within a VM. Moreover, the CPUID instruction does not trap. In order to simulate new processor features or disable processor features within the virtual machine, it's important to be able to trap on the CPUID when executed from a non-privileged mode.

In addition, context switching in a VM environment relies on the ability to save and restore the entire state of the processor, but the IA32 architecture does not allow this. More specifically, the cached segment descriptor state for each of the six segments (DS, ES, CS, SS, FS, and GS) are stored internal to the processor at the time of a segment reload, and this information cannot be accessed through any architecturally-defined mechanism. Consequently, this is a significant obstacle to correct virtualization. For example, if a piece of code loads a segment and then modifies the in-memory descriptor corresponding to that segment, a subsequent context switch will not be able to correctly restore the original segment descriptor information. Likewise, if the processor is operating in real mode and then switches to protected mode, the segments will contain selectors that do not correspond to descriptors within the protected mode GDT/LDT, and a context switch at this point would not be able to correctly restore the cached descriptors that were originally loaded within real mode.

Likewise, the PAUSE instruction (a prefixed form of NOP which was recently added to provide hyperthreaded processors hints about spin lock execution) incurs performance problems when used with spin locks on a multi-processor (MP) VM. For example, one virtual processor may spin on a lock that is held by a second virtual processor and, if the second virtual processor is running on a thread that is not currently executing, the first virtual processor may spin for a long time and thereby waste processor cycles as a result. While it would be useful if the virtual machine monitor could be notified if a VM is spinning-in order to allow the VMM to schedule another VM to run or to signal a second virtual processor thread to be scheduled—there is presently no such notification method available.

Certain VM environments make use of several different techniques to address these shortcomings and generally employ both emulation and direct execution in a hybrid manner. Specific techniques are chosen based on processor modes and other information derived from the OS itself. For such systems, there are generally four distinct processor mode categorizations recognized by the VMM as shown in FIG. 5. It is possible—and desirable—to override the default behavior in the case of Ring 0 mode (which is used for most modern OS kernel-level code). Much of the description below discusses the requirements for safely executing all ring 0 code through a direct-execution mechanism.

Many VM environments make use of a technique called "ring compression" (first used by DEC engineers to virtualize the VAX architecture). Ring compression involves executing ring 0 code within a less-privileged ring (e.g. ring 1) in order to allow the VMM to trap on certain privileged-level instructions that access virtualized resources. For example, the IA32 page table base pointer is stored within the CR3 register. The instruction that reads CR3 is only executable within ring 0. When executed from ring 1, this instruction causes the processor to generate a trap (specifically, a type 6 "illegal operation" exception). At the time of the trap, the VMM gains control and emulates the instruction, returning the virtualized (guest processor's) CR3 rather than the VMM (host processor's) CR3.

Figure 6:
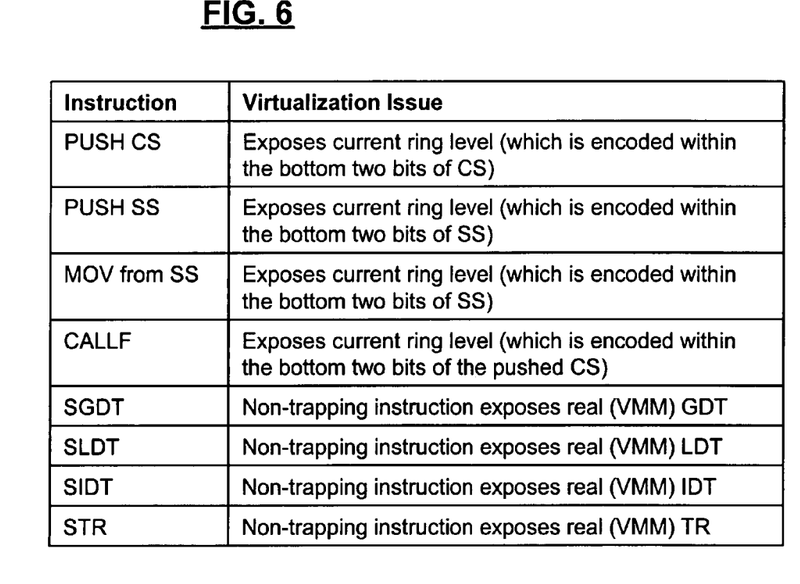
FIG. 6 is a table of x86 instructions that expose the fact that what is supposed to be ring 0 code is in fact running at a higher ring level, a problem with traditional x86 processor virtualization approaches.

For the most part, the VMM is able to hide the fact that code intended to be run at ring 0 is actually executing within a different ring level. In the preceding example, the code that accessed CR3 was not aware of the fact that a trap occurred because all of the important state changes associated with the instruction were emulated. However, these shortcomings of IA32 virtualization prevent ring compression from being entirely opaque. The instructions illustrated in FIG. 6 expose the fact that ring 0 code is running at a higher ring level, and code that uses these instructions is problematic and is generally unsafe to run within a direct-execution environment.

In addition, the IA32 architecture includes both a global and local descriptor table (GDT and LDT, respectively). These tables include code and data segments as well as gates that control inter-ring transitions. The guest OS may set up its GDT or LDT to allow transitions between ring 3 and ring 0. However, the VMM cannot allow any transition directly to ring 0 because that would give the guest OS direct control over the host processor. Instead, the VMM must be involved in any transition to ring 0 so it can properly redirect the execution to a lower-privileged ring level. This means the VMM is not able to use the guest's GDT and LDT directly. Rather, it must shadow the contents of the guest's GDT and LDT into-private tables, making adjustments as necessary to prevent any direct-to-ring-0 transitions. These adjustments are limited to the DPL (descriptor privilege level) field and the code bit of the descriptor type field. Because of these minor modifications, the shadowed descriptor tables may differ slightly from the guest descriptor tables.

Figure 7:
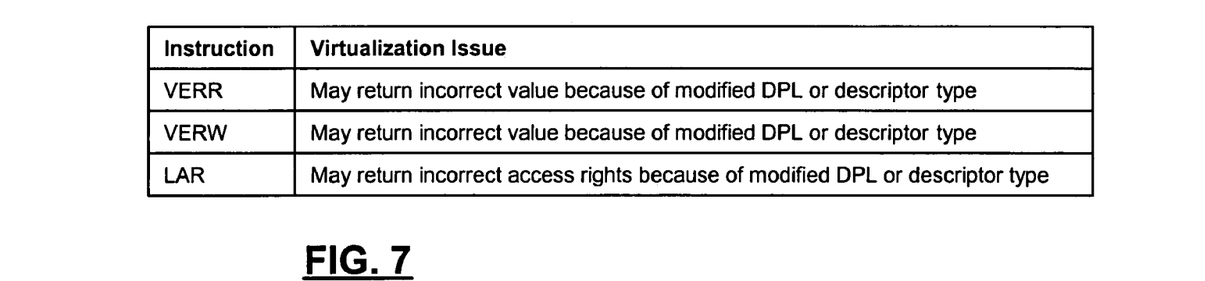
FIG. 7 is a table of instructions that expose the fact that a virtual machine is shadowing certain x86 register information for the guest operating system.

In most cases, these differences are not visible to software; however, there are several instructions in the IA32 architecture, illustrated in FIG. 7, that expose this difference. For example, the VMM write protects pages that overlap the guest GDT and LDT so that any attempt to modify these tables will result in a write-protection fault within the VMM. In response, the VMM ensures that the change to the guest GDT or LDT is reflected in its internal shadow tables. However, when the GDT or LDT entries correspond to a currently-loaded selector are modified, a modification to the corresponding in-memory descriptors is non-reversible because the IA32 architecture provides no way to read the currently-loaded segment descriptors. In this situation, the VMM must rely on emulation before allowing the in-memory descriptor to be modified.

Figure 8:
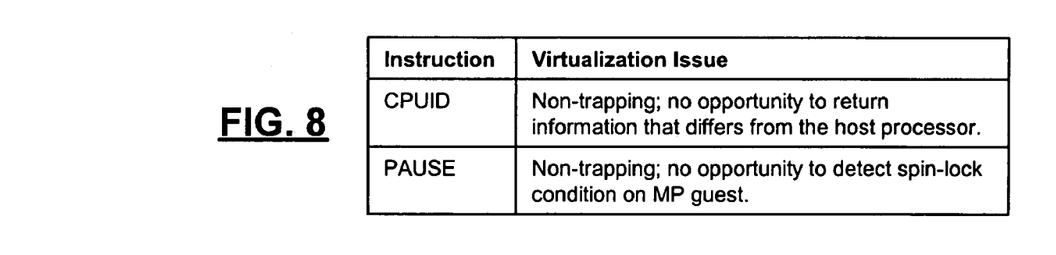
FIG. 8 is a table of instructions that should trap for purposes of virtualization but, in the x86 architectures, do not.

One particularly problematic aspect of IA32 virtualization involves the IF (interrupt mask flag) in the EFLAGS register in that, while this state should clearly be privileged, it is readily readable by non-privileged code. Furthermore, attempts to modify IF from within non-privileged code are simply ignored instead of generating a trap—in other words, while it is possible to trap on some instructions that manipulate the IF (including STI and CLI), other instructions that access the IF are non-trapping. Other instructions that are also non-trapping (but should be from a virtualization perspective) are illustrated in FIG. 8.

Unfortunately, while code is executing within a virtual machine, it is not feasible to mirror the real IF in a virtualized IF because this would allow the guest OS to turn off interrupts indefinitely, that is, it would be possible for a buggy guest OS to hang the entire host system. For this reason, the host IF is left enabled at all times (i.e. interrupts are not masked) when guest code is being executed, even when the virtualized (guest) IF is cleared.

Figure 9:
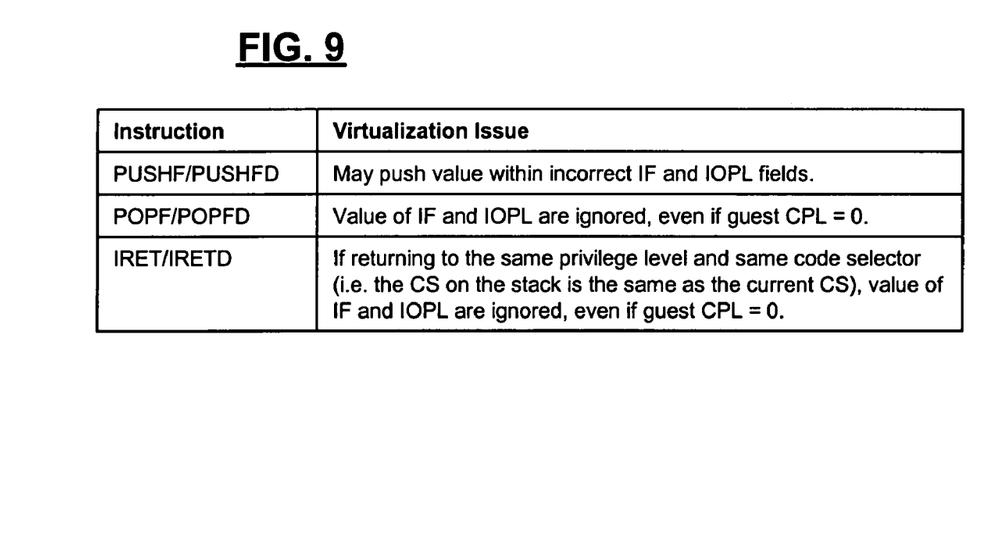
FIG. 9 is a table of problematic instructions pertaining to the IF and IOPL fields in the x86 architectures.

Similarly, trapping on STI/CLI instructions requires adjusting the IOPL field of the EFLAGS, with IOPL being yet another example of a privileged field that is readily exposed to non-privileged code with shortcomings similar to those associated with IF. Problematic instructions pertaining to the IF and IOPL fields are illustrated in FIG. 9.

The IA32 architecture also defines certain data structures that are used by the processor, including the TSS, GDT, LDT and IDT, and these data structures are located within the logical address space defined by the page tables. When a guest OS is running within a virtual machine, its page tables define which areas of the address space are used to map memory, frame buffers, memory-mapped registers, etc. Almost invariably, some portion of the address space is left unused. While the guest OS maintains its own TSS, GDT, LDT and IDT, the VMM provides its own private versions of these data structures. However, these structures must be mapped somewhere within the address space that is controlled by the guest OS. The VMM's code and internal data structures must also be mapped within the same address space. Consequently, the VMM needs to find some (relatively small) portion of the address space that isn't currently in use by the guest OS. This area is referred to as the "VMM working area". The VMM actively monitors the guest OS page tables to determine if the guest OS is attempting to map pages into the area currently occupied by the VMM working area. If so, the VMM finds another unused portion of address space and relocates itself.

This technique allows for broad guest OS compatibility, but it is problematic when the entire guest address space is being used which can occur when large amounts of physical memory are assigned to the virtual machine. For this reason, the VMM provides a mechanism by which the guest OS can reserve a portion of its address space specifically for the VMM working area. Once this space is specified, the VMM relocates itself to this space and stops actively tracking changes to the page tables (under the assumption that the guest OS is going to honor its promise to no longer use the reserved area).

Trapping instructions are a mixed blessing. On the one hand, if an instruction traps it can be properly virtualized. On the other hand, trapping imposes a very large performance overhead. For example, an STI instruction normally requires one cycle to, execute but when an STI is executed within a VM environment it causes a trap that is handled by the VMM which, on a PENTIUM 4 processor, often requires more than 500 cycles to execute. Certain VMs have attempted to mitigate this overhead by tracking high-frequency trapping instructions and, where possible, patching them with equivalent non-trapping code that preserves the semantics of the original instruction within the virtualized environment. This is done through the use of a non-pageable "patch buffer" allocated within the guest OS kernel space.

However, in operation, a patchable trapping instruction requires at least five bytes in length to allow for a long JMP instruction-without this requisite five bytes, the VMM would need to overwrite the instruction or instructions that follow the trapping instruction because the instruction to be patched may be less than five bytes in length.

Improved Virtualization (e.g., IA32)

Figure 10:
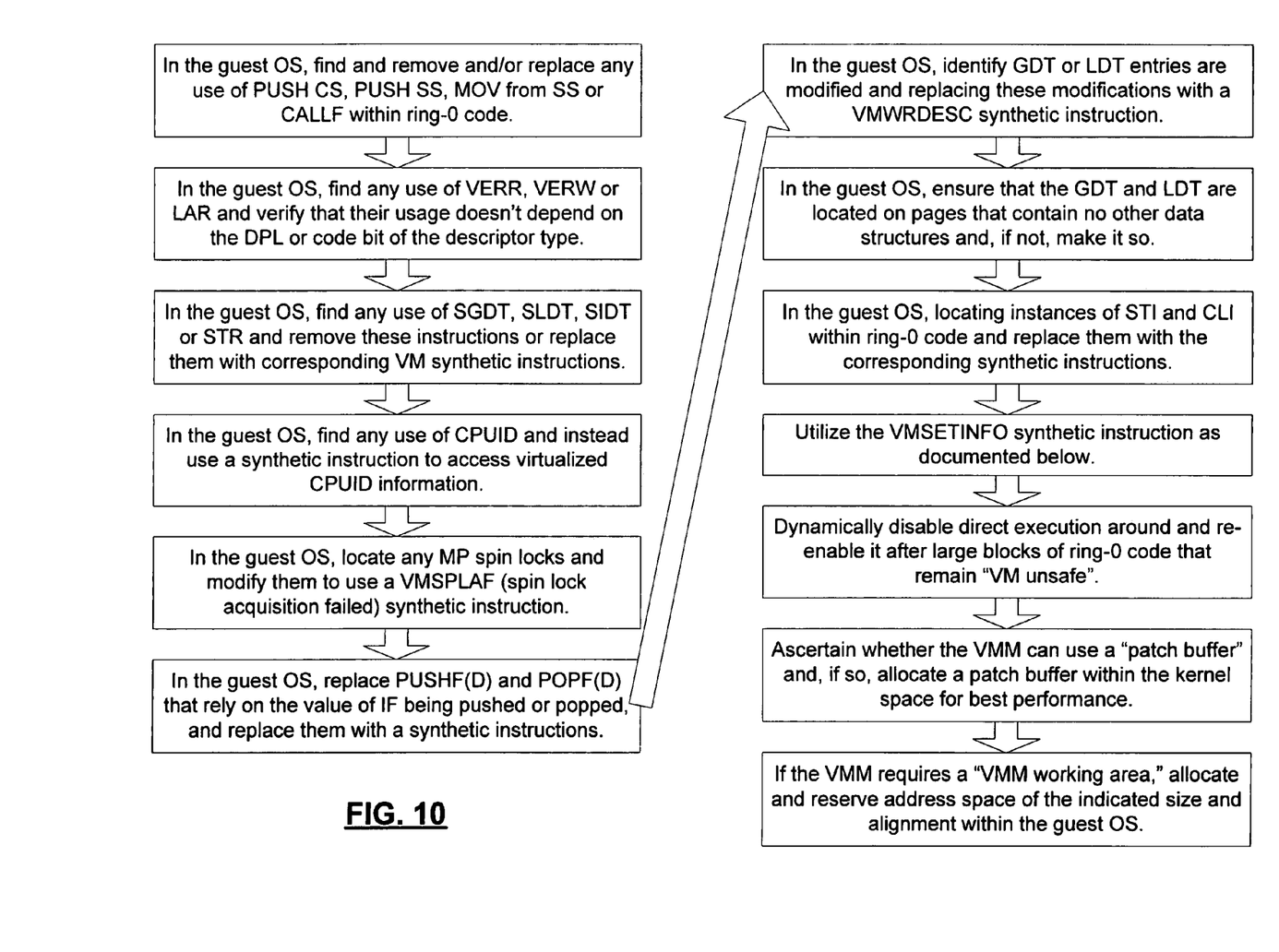
FIG. 10 is a flowchart illustrating one embodiment of a method for improving the virtualization in an IA32 architecture by optimizing the OS code and using "synthetic instructions."

Many of the foregoing shortcomings and limitations of the IA32 architecture result from instructions that fail to cause a trap when one is desired. In other words, if these instructions would instead cause a trap, the VMM could correctly emulate these instructions. The present invention provides various embodiments to effectively create traps for these problematic instructions. Various embodiments of the present invention are directed to improving the virtualization in an IA32 architecture by optimizing the OS code and using "synthetic instructions" (discussed in detail later herein). Several embodiments of the present invention comprise a series of steps, illustrated in FIG. 10, to optimize a guest OS as follows:

- In the guest OS, find and remove and/or replace any use of PUSH CS, PUSH SS, MOV from SS or CALLF within ring-0 code. As discussed above, these instructions expose the fact that ring 0 code running within a virtual machine is actually running at a lower-privilege ring level. However, these instructions are very rare in most operating systems and can generally be either removed altogether or replaced with other existing instructions or groups of existing instructions.
- In the guest OS, find any use of VERR, VER W or LAR and verify that their usage doesn't depend on the DPL or code bit of the descriptor type. Once again, these instructions are not used in most OSes.
- In the guest OS, find any use of SGDT, SLDT, SIDT or STR and remove these instructions or replace them with corresponding VM synthetic instructions. To implement this step, a descriptor table entry in the guest operating system is replaced with a synthetic instruction (e.g., VMWRDESC) that updates the descriptor table entry, avoiding overheads associated with maintaining shadow descriptor tables.
- In the guest OS, find any use of CPUID-that is, where it is accessed in the OS by a common subroutine that all portions of the system use to access CPUID information—and modify the common subroutine that reads the CPUID to use a synthetic instruction to access virtualized CPUID information instead of reading the CPUID directly. While CPUID virtualization is not necessary as long as the specific CPUID information returned by the host processor does not conflict with the guest features, if a new processor were to implement a feature that the VMM didn't provide support then a virtualized CPUID value would indicate that the feature was not present while but the non-virtualized CPUID value would indicate it was.
- In the guest OS, locate any MP spin locks and modify them to use a VMSPLAF (spin lock acquisition failed) synthetic instruction.
- In the guest OS, find any instances of PUSHF(D) and POPF(D) and, if the usage of these instructions relies on the value of IF being pushed or popped, replace them with a corresponding synthetic instruction. This step will typically represent the majority of the work involved in making an OS "VM clean".
- In the guest OS, identifying locations where GDT or LDT entries are modified and reducing to a minimum the number of modifications and then replacing the remaining modifications with a VMWRDESC synthetic instruction. (Be especially careful to avoid the situation where a currently-loaded selector is modified.)
- In the guest OS, ensure that the GDT and LDT are located on pages that contain no other data structures and, if not, make it so.
- In the guest OS, locating instances of STI and CLI within ring-0 code and replacing them with the corresponding synthetic instructions that are five bytes long. By using the synthetic forms, the VMM will be able to better patch the code to reduce the need for traps since directly patching STI and CLI instructions, which are each less than five bytes in length, requires the VMM to overwrite the instruction or instructions that follow the trapping instruction due to the fact that a typical patchable trapping instruction requires at least five bytes in length to allow for a long JMP instruction.
- Utilize the VMSETINFO synthetic instruction as documented below. The foregoing nine instructions completed the "VM cleaning" so that this synthetic instruction can enable direct execution within ring 0.
- Dynamically disable direct execution around and re-enable it after large blocks of ring-0 code that remain "VM unsafe". By providing a synthetic instruction for a guest operating system to dynamically disable (e.g., VMDXDSBL) and re-enable (VMDXENBL) direct execution—the guest operating system can avoid large blocks of "VM unsafe" ring-0 code.
- Ascertain whether the VMM can use a "patch buffer" and, if so, allocate a patch buffer within the kernel space for best performance. This patch buffer must be non-pageable, mapped into all address space contexts where ring-0 code is executed, and of a size indicated by the VMGETINFO synthetic instruction. The location and size of the patch buffer can be set using the VMSETINFO instruction as documented below. The patch buffer should be allocated once for the entire system, not for each virtual processor.
- Determine whether the VMM requires a "VMM working area" and, if so, allocate and reserve address space of the indicated size and alignment within the guest OS. Set the base of this reserved area through the use of the VMSETINFO instruction as discussed later herein.

VM "synthetic instructions" are otherwise-illegal processor instructions that have special meanings to the VM. As such, when synthetic instructions are executed within a VM that does not support synthetic instructions or in a non-VM environment, they generate a type-6 (illegal operation) exception, and therefore it is important for an OS to check for synthetic instruction support before using them. To check for VM synthetic instruction support, the OS executes a VMCPUID instruction and, if this instruction generates an illegal instruction fault, the OS has determined that synthetic instructions are not supported. (Note that VMCPUID can be executed from all privilege levels, so it is safe to use in user-level code.) This same test can be used to determine whether you are executing within a VM environment and, if so, thereafter permit the virtual machine to access or modify features or behaviors of the underlying VMM. The following is example code that uses a try/except mechanism and structured exception handling to perform such a test:

```
BOOL
SyntheticInstructionsSupported( )
{
    Boolean synthInstrSupported = TRUE;
    __try {
        __asm {
            __emit 0x0F   // Emit VMCPUID instruction
            __emit 0xC7
            __emit 0xC8
            __emit 0x01
            __emit 0x00
        }
    } __except(EXCEPTION_EXECUTE_HANDLER) {
        synthInstrSupported = FALSE;
    }
    return synthInstrSupported;
}
```

Using synthetic instructions, an x86 ISA instruction that adversely affects virtualization on an x86 processor can thus be replaced with or supplemented by a synthetic instruction that causes an exception in the x86 processor that is then trapped by a virtual machine running on said x86 processor for processing by said virtual machine. Likewise, for recursive virtualization, wherein a first virtual machine is running on a second virtual machine, an instruction that is either replaced with or supplemented by a synthetic instruction to cause an exception in the x86 processor can be passed through the second virtual machine to be trapped by said first virtual machine for processing.

For several embodiments of the present invention, synthetic instructions are all five bytes in length, allowing them to be patched with a JMP instruction to reduce trapping overhead. (In other embodiments, synthetic instructions may be of greater or shorter length.) The hexadecimal encoding for synthetic instructions use the following format: OF C7 C8 XX XX (where "XX" are two-digit hexadecimal variables for identifying specific synthetic instructions). This instruction decodes as a CMPXCHG8B instruction but it is considered "illegal" because the specified destination operand is a register (and thus results in a trap). However, in several embodiments of the present invention, synthetic instructions do not support any form of instruction prefixes (e.g. LOCK, REP, segment overrides, operand size override, address size override), and attempts to use prefixes in such embodiments will result in an illegal instruction exception (UD#).

Synthetic Instructions

A subset of synthetic instructions for various embodiments of the present invention are described here in detail. Additional synthetic instructions not listed here have also been described earlier herein. Also, additional synthetic instructions not explicitly described herein are nonetheless anticipated by various embodiments of the present invention, and nothing herein should be taken to limit the invention to the specific synthetic instructions explicitly identified.

VMGETINFO—Get VM Information

VMGETINFO fetches a specific piece of VM information and places it into EDX:EAX. The information returned is dependent on the index in ECX. If the specified index refers to a piece of information that is not supported by the virtual processor, a GP(0) is generated. If the index refers to a supported piece of information, EDX:EAX is set to the information value. (Note that the register convention used for this instruction is similar to the RDMSR instruction.) This instruction differs from most processor instructions in that it affects the state of the entire system. On systems with multiple processors, a state accessed with VMGETINFO is considered "global". For example, setting the VMM Working Area Base using VMSETINFO on one processor allows the same value to then be read back using VMGETINFO on a second processor.

VMSETINFO—Set VM Information

VMSETINFO sets a specific piece of VM information as specified in EDX:EAX. The information to be set is dependent on the index in ECX. If the specified index refers to a piece of information that is not supported by the virtual processor or is not writable, a GP(0) is generated. (Note that the register convention used for this instruction is similar to the WRMSR instruction.) This instruction differs from most processor instructions in that it affects the state of the entire system. On systems with multiple processors, state set with VMSETINFO is considered "global". For example, setting the VMM Working Area Base using VMSETINFO on one processor enables that data to then be read back using VMGETINFO on a second processor.

VMDXDSBL—Disable Direct Execution

VMDXDSBL disables direct execution until the next time direct execution is enabled through the use of VMDXENBL. This instruction can only be executed from within ring 0 code and should only be executed when interrupts (or any form of preemption) is disabled to prevent direct execution from being disabled for long periods of time. It can be used to protect small blocks of code that are not "VM safe" (i.e. contain a number of non-virtualizable instructions or assumptions that are broken when running in direct execution within a VM environment). This instruction only affects the processor on which it is executed. It does not affect other virtual processors in the virtual machine. If direct execution is already disabled, this instruction does nothing.

VMDXENBL—Enable Direct Execution

VMDXENBL enables direct execution where possible. This instruction can only be executed from within ring 0 code and should only be executed when interrupts (or any form of preemption) is disabled. It can be used in conjunction with the VMDXDSBL instruction to protect small blocks of code that are not "VM safe" (i.e. contain a number of non-virtualizable instructions or assumptions that are broken when running in direct execution within a VM environment). This instruction only affects the processor on which it is executed. It does not affect other virtual processors in the virtual machine. If direct execution is already enabled, this instruction does nothing.

VMCPUID—Virtualized CPU Information

VMCPUID is similar to a real CPULID instruction except that it returns shadowed CPU information.

VMHLT—Halt

VMHLT is similar to the normal HLT instruction except that it can be executed from any processor mode—including ring 3 and x86 mode. It can be inserted into any "idle loop" to reduce processor utilization within a virtual machine. In certain embodiments, this synthetic instruction for halting the processor (e.g., VMHALT) can be executed as user-level guest code.

VMSPLAF—Spin Lock Acquisition Failed

Spin locks are frequently used within operating systems that support symmetric multiprocessing. These locks typically protect a critical resource that is shared between processors. They rely on the fact that the lock will be held for relatively few cycles by another other processor. Within a multi-processor VM system, typical spin lock behavior can result in poor performance and high CPU utilization if the virtual processor that holds a spin lock is temporarily preempted and not running while other virtual processors wait for a resource held by the suspended processor. To avoid this situation, the VMSPLAF instruction can be used to notify the VMM that the OS is waiting on a spin lock that it failed to acquire. In response, the VMM can either schedule another virtual processor to run or suspend the current virtual processor and schedule it for later execution at a time when the resource has been freed.

VMPUSHFD—Push Virtualized Flags Resister

VMPUSHFD is similar to the normal PUSHFD instruction except that it is "VM safe". It assumes both a 32-bit operand size and a 32-bit stack pointer. If CS and SS are not currently 32-bit, its behavior is undefined. It is also not guaranteed to perform segment bounds or write checks in the same way a real PUSHFD instruction would. The value of the EFLAGS register pushed onto the stack will contain the shadowed IF value. However, the value of the IOPL field may not be correct. Code that requires reading the IOPL should use the value of the EFLAGS pushed onto the stack in response to an INT instruction, external interrupt or exception. This instruction can only be used within ring 0 code.

VMPOPFD—Pop Virtualized Flags Resister

VMPOPFD is similar to the normal POPFD instruction except that it is "VM safe". It assumes both a 32-bit operand size and a 32-bit stack pointer. If CS and SS are not currently 32-bit, its behavior is undefined. It is also not guaranteed to perform segment bounds or write checks in the same way a real PUSHFD instruction would. The value of the IF field within the popped EFLAGS will be honored. However, the value of the IOPL field may be ignored. Code that requires adjusting the IOPL should use the IRETD or VMIRETD instruction. This instruction can only be used within ring 0 code.

VMCLI—Clear Interrupt Flag

VMCLI is similar to the normal CLI instruction except that it is five bytes long and can be patched to avoid trapping into the VMM. This instruction can only be used within ring 0 code.

VMSTI—Set Interrupt Flag

VMSTI is similar to the normal STI instruction except that it is five bytes long and can be patched to avoid trapping into the VMM. It also differs from the normal STI in that it does not prevent an interrupt from occurring before the next instruction is complete. The only exception to this rule is if the VMSTI is followed by a SYSEXIT instruction, which is executed atomically along with the VMSTI. This instruction can only be used within ring 0 code.

VMIRETD—Return from Interrupt

VMIRETD is similar to the normal IRETD instruction except that it is "VM safe". Unlike the normal IRETD instruction, this one always assumes a 32-bit operand size and 32-bit stack pointer. Its behavior is undefined if the current size of CS and SS is not 32-bit. This instruction can only be used within ring 0 code. It should be used wherever IRETD is potentially used to return to v86 mode. Use of the VMIRETD avoids an unfortunate behavior of an IA32 processor when returning to v86 mode from a CPL>0. (Note that ring compression results in ring 0 code running within the VM environment at a less-privileged ring level.)

VMSGDT—Store Global Descriptor Table

VMSGDT is similar to a real SGDT instruction except that it stores the shadowed GDT base and length. It assumes that the addressing mode for the memory operand is DS[EAX] and that DS is a wide-open writable segment. If DS is not a wide-open writable segment, its behavior is undefined.

VMSIDT—Store Interrupt Descriptor Table

VMSIDT is similar to a real SIDT instruction except that it stores the shadowed IDT base and length. It assumes that the addressing mode for the memory operand is DS[EAX] and that DS is a wide-open writable segment. If DS is not a wide-open writable segment, its behavior is undefined.

VMSLDT—Store Local Descriptor Table

VMSLDT is similar to a real SLDT instruction except that it stores the shadowed LDT selector. It assumes that the destination operand is the EAX register.

VMSTR—Store Task Register

VMSTR is similar to a real STR instruction except that it stores the shadowed LDT selector. It assumes that the destination operand is the EAX register.

VMSDTE—Store to Descriptor Table Entry

VMSDTE is used to update a descriptor entry within the GDT or LDT. To use, load the selector into ECX. The top 16 bits and bottom two bits (bit 0 and 1) of ECX are ignored. Bit 2 of ECX indicates whether the selector references the global or local descriptor table. The remaining portion (bits 3 through 15) encode the selector—i.e. the offset into the descriptor table. EDX:EAX should be loaded with the value to write to the specified descriptor table entry. This instruction should be used instead of directly modifying the descriptor tables so the VMM's shadow descriptor tables can be updated at the same time. Do not modify the descriptor entry corresponding to a currently-loaded segment selector. This will result in undefined behavior. Do not use this instruction if it is not recommended by the VMM (as indicated by the VMM Info bit 4 returned by the VMGETINFO instruction). Using this instruction when it is not recommended may result in poor performance when running on future VMM implementations. This instruction can only be used from ring 0 code.

CONCLUSION

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for processor virtualization in processor architectures comprising:
   identifying in the instruction set of a guest operating system one or more predefined instructions, wherein said one or more predefined instructions do not cause the processor to trap execution of said one or more predefined instructions;
   removing, replacing, or supplementing the identified one or more predefined instructions with at least one synthetic instruction that causes at least one exception to be trappable by a virtualization program, wherein said synthetic instructions are illegal to said architecture; and
   using at least one of said synthetic instructions to enable direct execution on a physical processor of instructions issued by said guest operating system;
   wherein said at least one of said synthetic instructions is executed from within guest kernel code.

2. The method of claim 1 wherein said one or more predefined instructions comprise x86 instructions including one or more of:
   PUSH CS, PUSH SS, MOV from SS, CALLF, VERR, VERW, and LAR.

3. The method of claim 1 wherein an instruction that adversely affects virtualization on an x86 processor is either replaced with or supplemented by a synthetic instruction that causes an exception in the x86 processor that is then trapped by a virtual machine running on said x86 processor for processing by said virtual machine.

4. The method of claim 3 wherein, for a first virtual machine running on a second virtual machine, an instruction that is either replaced with or supplemented by a synthetic instruction to cause an exception in the x86 processor that is then trapped by said first virtual machine running on said x86 processor for processing by said virtual machine by effectively by-passing said second virtual machine.

5. The method of claim 3 wherein at least one synthetic instruction of said synthetic instructions is usable in both a user mode and a privileged mode.

6. The method of claim 3 wherein at least one synthetic instruction of said synthetic instructions has no corollary to an existing x86 instruction.

7. The method of claim 3 wherein at least one synthetic instruction of said synthetic instructions is an instruction for disabling direct execution.

8. The method of claim 3 wherein, for an instruction that is replaced with a synthetic instruction, the synthetic instruction is semantically similar to the instruction that is being replaced.

9. The method of claim 8 wherein an instruction of less than five bytes in length is replaced with a synthetic instruction of at least five bytes in length (e.g., to facilitate patching).

10. The method of claim 9 wherein an STI instruction is replaced with a synthetic instruction that is at least five bytes long.

11. The method of claim 9 wherein a CLI instruction is replaced with a synthetic instruction that is at least five bytes long.

12. The method of claim 3 wherein a CPUID instruction in the guest operating system is replaced with a synthetic instruction that reads virtualized CPUID information.

13. The method of claim 3 wherein at least one multi-processor spin lock instruction in the guest operating system is supplemented with a synthetic instruction for determining when a spin lock acquisition has failed.

14. The method of claim 3 wherein a PUSHF(D) instruction in the guest operating system is replaced with a synthetic instruction that pushes IF onto a stack.

15. The method of claim 3 wherein a POPF(D) instruction in the guest operating system is replaced with a synthetic instruction that pops IF off of a stack.

16. The method of claim 3 wherein an instruction that modifies a descriptor table entry in the guest operating system is replaced with a synthetic instruction that updates the descriptor table entry, avoiding overheads associated with maintaining shadow descriptor tables.

17. The method of claim 3 wherein an SGDT instruction in the guest operating system is replaced with a synthetic instruction that stores a current GDT base and length to EAX.

18. The method of claim 3 wherein a SLDT instruction in the guest operating system is replaced with a synthetic instruction that stores the current LDT selector to EAX.

19. The method of claim 3 wherein a SIDT instruction in the guest operating system is replaced with a synthetic instruction that stores the current IDT base and length to EAX.

20. The method of claim 3 wherein a STR instruction in the guest operating system is replaced with a synthetic instruction that stores the current TR selector to EAX.

21. The method of claim 3 wherein a CLI instruction in the guest operating system is replaced with a synthetic instruction that clears a virtualized IF.

22. The method of claim 3 wherein a STI instruction in the guest operating system is replaced with a synthetic instruction that sets a virtualized IF.

23. The method of claim 3 wherein a synthetic instruction for halting the processor can be executed as user-level guest code.

24. A method for a guest operating system to determine whether it is running on a virtualized processor or running directly on a hardware processor, said method comprising:
   executing a synthetic instruction for returning a value representing an identity for the central processing unit, wherein said synthetic instructions are configured to cause at least one exception to be trappable by a virtualization layer, and wherein said synthetic instructions are illegal to said processor architecture;

wherein said synthetic instruction is configured to be executed from any privileged level;

when a value is returned, using synthetic instructions; and not using synthetic instructions when an exception occurs.

25. The method of claim 24 further comprising, if a value is returned, then accessing or modifying features or behaviors of the underlying virtual machine monitor.

26. The method of claim 24 wherein the hexadecimal operation code for said synthetic instruction is 0F C7 C8 01 00.

27. A method for improving guest operating system code for efficient patching of trappable instructions using a long JMP instruction, said method comprising the step of:

in a guest operating system, locating instances of trappable instructions that are less than five bytes long, including instructions that run within ring-0code;

replacing the trappable instructions with corresponding synthetic instructions that are at least five bytes long;

wherein said synthetic instructions are configured to cause at least one exception to be trappable by a virtualization layer, and wherein said synthetic instructions are illegal to a physical processor architecture underlying said guest operating system.

28. A system for processing synthetic instructions on x86 processor architectures and their equivalents, comprising:

a processor having an x86 architecture:

a memory coupled to said processor by way of a bus:

a subsystem stored in said memory for trapping said synthetic instructions issued by a guest operating system after said synthetic instructions cause an exception in the x86 processor; and a subsystem stored in said memory for processing said synthetic instructions for the guest operating system;

wherein at least one synthetic instruction of said synthetic instructions is configured to enable direct execution within ring 0 layer of privilege.

29. The system of claim 28 further comprising a subsystem whereby a synthetic instruction for determining when a spin lock acquisition has failed is trapped and processed.

30. The system of claim 28 further comprising a subsystem for processing a synthetic instruction for pushing an IF onto a stack.

31. The system of claim 28 further comprising a subsystem for processing a synthetic instruction for popping an IF off of a stack.

32. The system of claim 28 further comprising a subsystem for processing a synthetic instruction that updates the descriptor table entry, avoiding overheads associated with maintaining shadow descriptor tables.

33. The system of claim 28 further comprising a subsystem for processing a synthetic instruction for storing the current GDT base and length to EAX.

34. The system of claim 28 further comprising a subsystem for processing a synthetic instruction for storing the current LDT selector to EAX.

35. The system of claim 28 further comprising a subsystem for processing a synthetic instruction for storing the current IDT base and length to EAX.

36. The system of claim 28 further comprising a subsystem for processing a synthetic instruction for storing the current TR selector to EAX.

37. The system of claim 28 further comprising a subsystem for processing a synthetic instruction for clearing a virtualized IF.

38. The system of claim 28 further comprising a subsystem for processing a synthetic instruction for setting a virtualized IF.

39. The system of claim 28 further comprising a subsystem for processing a synthetic instruction for halting the processor can be executed as user-level guest code.

40. The system of claim 28 further comprising a subsystem for determining whether said system is running on a virtualized processor or running directly on an x86 processor, said subsystem comprising:

a subsystem for executing a synthetic instruction for returning a value representing an identity for features supported by the central processing unit; and a subsystem for determining if a value is returned and (a) if so, concluding that the operating system is running on a virtualized processor, and thereafter utilize synthetic instructions, and (b) if not, concluding that the operating system is running directly on an x86 processor, and thereafter refrain from utilizing synthetic instructions.

41. The system of claim 40 further comprising a subsystem for accessing or modifying features or behaviors of the underlying virtual machine monitor if a value is returned.

42. The system of claim 40 wherein the hexadecimal operation code for said synthetic instruction is 0F C7 C8 01 00.

43. The system of claim 28 wherein said synthetic instructions comprise a synthetic instruction for disabling direct execution.

44. The system of claim 28 wherein said synthetic instructions comprise a synthetic instruction for enabling (or re-enabling) direct execution.

45. The system of claim 28 wherein said synthetic instructions comprise:

a synthetic instruction for pushing an IF onto a stack; and a synthetic instruction for popping an IF off of a stack.

46. The system of claim 45 wherein said synthetic instructions further comprise:

a synthetic instruction for storing the current GDT base and length to EAX;

a synthetic instruction for storing the current LDT selector to EAX;

a synthetic instruction for storing the current IDT base and length to EAX; and a synthetic instruction for storing the current TR selector to EAX.

47. The system of claim 45 wherein said synthetic instructions further comprise:

a synthetic instruction for clearing a virtualized IF; and a synthetic instruction for setting a virtualized IF.

48. The system of claim 45 wherein said synthetic instructions further comprise a synthetic instruction for determining when a spin lock acquisition has failed is trapped and processed.

49. The system of claim 45 wherein said synthetic instructions further comprise a synthetic instruction for returning a value representing an identity for the central processing unit.

50. The system of claim 49 wherein the hexadecimal operation code for said synthetic instruction is 0F C7 C8 01 00.

51. A computer-readable medium storing thereon computer-readable instructions for improving processor virtualization in x86 processor architectures and their equivalents, including but not limited to the IA32 architecture, said computer-readable instructions comprising:

at least one synthetic instruction that causes an exception in the x86 processor that is then trapped by a virtual machine monitor running on said x86 processor for processing by said virtual machine monitor;

wherein said at least one synthetic instruction is illegal to said processor architecture; and wherein said exception is a result of the execution of higher privileged code at a lower privileged level.

52. The computer-readable instructions of claim 51 further comprising instructions whereby at least one multi-processor spin lock instruction in the guest operating system is supplemented with a synthetic instruction for determining when a spin lock acquisition has failed.

53. The computer-readable instructions of claim 51 further comprising a synthetic instruction for returning a value representing an identity for the central processing unit.

54. The computer-readable instructions of claim 51 further comprising a synthetic instruction that pushes IF onto a stack.

55. The computer-readable instructions of claim 51 further comprising a synthetic instruction that pops IF off of a stack.

56. The computer-readable instructions of claim 51 further comprising a synthetic instruction that stores the current GDT base and length to EAX.

57. The computer-readable instructions of claim 51 further comprising a synthetic instruction that stores the current LDT selector to EAX.

58. The computer-readable instructions of claim 51 further comprising a synthetic instruction that stores the current IDT base and length to EAX.

59. The computer-readable instructions of claim 51 further comprising a synthetic instruction that stores the current TR selector to EAX.

60. The computer-readable instructions of claim 51 further comprising a synthetic instruction that clears a virtualized IF.

61. The computer-readable instructions of claim 51 further comprising a synthetic instruction that sets a virtualized IF.

62. The computer-readable instructions of claim 51 further comprising instructions for determining whether said instructions are running on a virtualized processor or running directly on an x86 processor, said instructions comprising:
    instructions for executing a synthetic instruction for returning a value representing an identity for the central processing unit; and
    instructions for determining if value corresponding to an identity for the central processing unit is returned and (a) if so, utilizing synthetic instructions, and (b) if not, suspending use of synthetic instructions.

63. The computer-readable instructions of claim 62 wherein the hexadecimal operation code for said synthetic instruction is 0F C7 C8 01 00.

64. A system for processing synthetic instructions when executing on x86 processor architectures, said system comprising:
    a processor having an x86 architecture:
    a memory coupled to said processor by way of a bus:
    computer readable instructions stored in said memory that when executed by said processor cause removing, replacing, or supplementing instances of one or more of the following predefined instructions in a guest operating system: PUSH CS, PUSH SS, MOV from SS, CALLF, VERR, VERW, and LAR with synthetic instructions that are configured to cause at least one exception to be trappable by a virtualization layer, and wherein said synthetic instructions are illegal to said processor architecture.

65. A method for optimizing a guest operating system to improve processor virtualization when executing on x86 processor architectures and their equivalents, including but not limited to the IA32 architecture, said method comprising:
    removing, replacing, or supplementing instances of one or more of the following predefined instructions in the guest operating system: PUSH CS, PUSH SS, MOV from SS, CALLF, VERR, VERW, and LAR;
    replacing CPUID instructions in the guest operating system with synthetic instructions that reads virtualized CPUID information;
    supplementing spin lock instructions in the guest operating system with synthetic instructions for determining when a spin lock acquisition has failed;
    replacing PUSHF(D) instructions in the guest operating system with synthetic instructions for pushing IF onto a stack;
    replacing POPF(D) instructions in the guest operating system with synthetic instructions for popping IF off of a stack;
    replacing SGDT instructions in the guest operating system with synthetic instructions for storing a current GDT base and length to EAX;
    replacing SLDT instructions in the guest operating system with synthetic instructions for storing a current LDT selector to EAX;
    replacing SIDT instructions in the guest operating system with synthetic instructions for storing a current IDT base and length to EAX;
    replacing STR instructions in the guest operating system with synthetic instructions for storing the current TR selector to EAX;
    replacing CLI instructions in the guest operating system with synthetic instructions for clearing a virtualized IF;
    replacing STI instructions in the guest operating system with synthetic instructions for setting a virtualized IF.

66. A method for processing synthetic instructions executable on a processor architecture, comprising:
    removing, replacing, or supplementing at least one predefined instruction in a guest operating system, running in a virtual machine environment, with synthetic instructions;
    determining whether said synthetic instructions are supported by said virtual machine environment by executing at least one of said synthetic instructions;
    enabling direct execution of instructions on said processor architecture using at least one of said synthetic instructions;
    wherein at least one of said synthetic instructions is configured to cause at least one exception trappable by a virtualization layer when privileged-level code is run at user-level, wherein at least one of said synthetic instructions is illegal to said processor architecture;
    causing said at least one exception to be issued by said processor architecture by using at least one of said synthetic instructions;
    invoking a trap handler within said virtualization layer in order to trap said at least one exception;
    emulating with said virtualization layer any implied state changes based on processing of said at least one exception; and
    returning control to any subsequent instructions of said guest operating system.

* * * * *